(12) United States Patent
Hasegawa

(10) Patent No.: US 7,853,787 B2
(45) Date of Patent: Dec. 14, 2010

(54) PERIPHERAL DEVICE FOR PROGRAMMABLE LOGIC CONTROLLER

(75) Inventor: Shin Hasegawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 490 days.

(21) Appl. No.: 10/574,420

(22) PCT Filed: Jan. 11, 2005

(86) PCT No.: PCT/JP2005/000168

§ 371 (c)(1),
(2), (4) Date: Jul. 11, 2008

(87) PCT Pub. No.: WO2006/075355

PCT Pub. Date: Jul. 20, 2006

(65) Prior Publication Data

US 2008/0276087 A1    Nov. 6, 2008

(51) Int. Cl.
*H04L 9/32* (2006.01)
*G06F 7/04* (2006.01)
*G06F 12/00* (2006.01)
*G06F 12/14* (2006.01)

(52) U.S. Cl. .................. 713/168; 726/9; 726/20; 713/150

(58) Field of Classification Search .................. 713/168
See application file for complete search history.

(56) References Cited

U.S. PATENT DOCUMENTS

| | | | | |
|---|---|---|---|---|
| 4,465,901 A * | 8/1984 | Best | ............................ | 713/190 |
| 4,862,501 A * | 8/1989 | Kamitake et al. | ............ | 713/172 |
| 5,237,609 A * | 8/1993 | Kimura | ....................... | 713/193 |
| 6,088,802 A * | 7/2000 | Bialick et al. | ................... | 726/3 |
| 6,336,585 B1 * | 1/2002 | Harada | ....................... | 235/380 |
| 7,089,388 B1 * | 8/2006 | Takaragi et al. | .............. | 711/164 |
| 7,093,021 B2 * | 8/2006 | Blumenau et al. | ........... | 709/229 |
| 7,624,281 B2 * | 11/2009 | Mehta et al. | ................. | 713/186 |
| 2002/0095588 A1 * | 7/2002 | Shigematsu et al. | ......... | 713/186 |
| 2003/0140234 A1 * | 7/2003 | Noda et al. | .................. | 713/186 |
| 2004/0030891 A1 * | 2/2004 | Kurihara | ...................... | 713/168 |
| 2005/0102527 A1 * | 5/2005 | Tatebayashi et al. | ........ | 713/189 |
| 2007/0168674 A1 * | 7/2007 | Nonaka et al. | .............. | 713/182 |

FOREIGN PATENT DOCUMENTS

| | | |
|---|---|---|
| JP | 10-124308 A | 5/1998 |
| JP | 2004-15077 A | 1/2004 |
| JP | 2004-355233 A | 12/2004 |
| WO | 0017758 A1 | 3/2000 |
| WO | WO 00/17758 * | 3/2000 |

* cited by examiner

*Primary Examiner*—Syed A. Zia
*Assistant Examiner*—Trang Doan
(74) *Attorney, Agent, or Firm*—Sughrue Mion, PLLC

(57) ABSTRACT

A peripheral device for a programmable logic controller includes an encrypter, an external storage that stores peripheral authentication data that has been encrypted, an internal storage that stores peripheral device authentication data that has been encrypted, a decrypter, and a verifier that determines whether or not use of the peripheral device for the programmable logic controller is authorized by checking the peripheral device authentication data read out and decrypted from the external storage, against the peripheral device authentication data read out and decrypted from the internal storage. If the verifier authorizes use of the peripheral device, encrypted authentication data is read out of the internal or external storage, decrypted, and transmitted to a PC for authorizing reading and writing of data in the PC.

4 Claims, 16 Drawing Sheets

[Fig. 1]
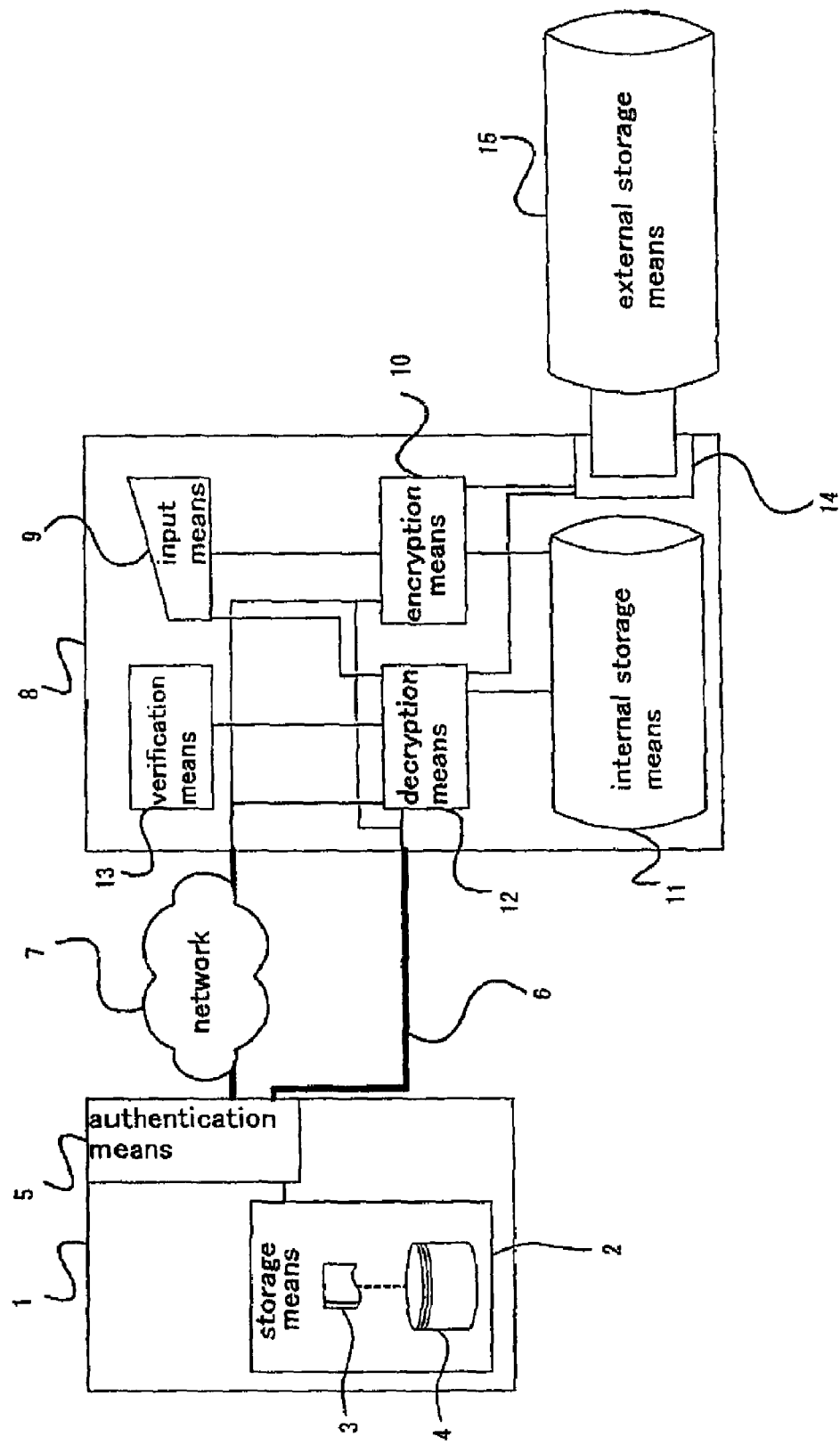

[Fig. 2]
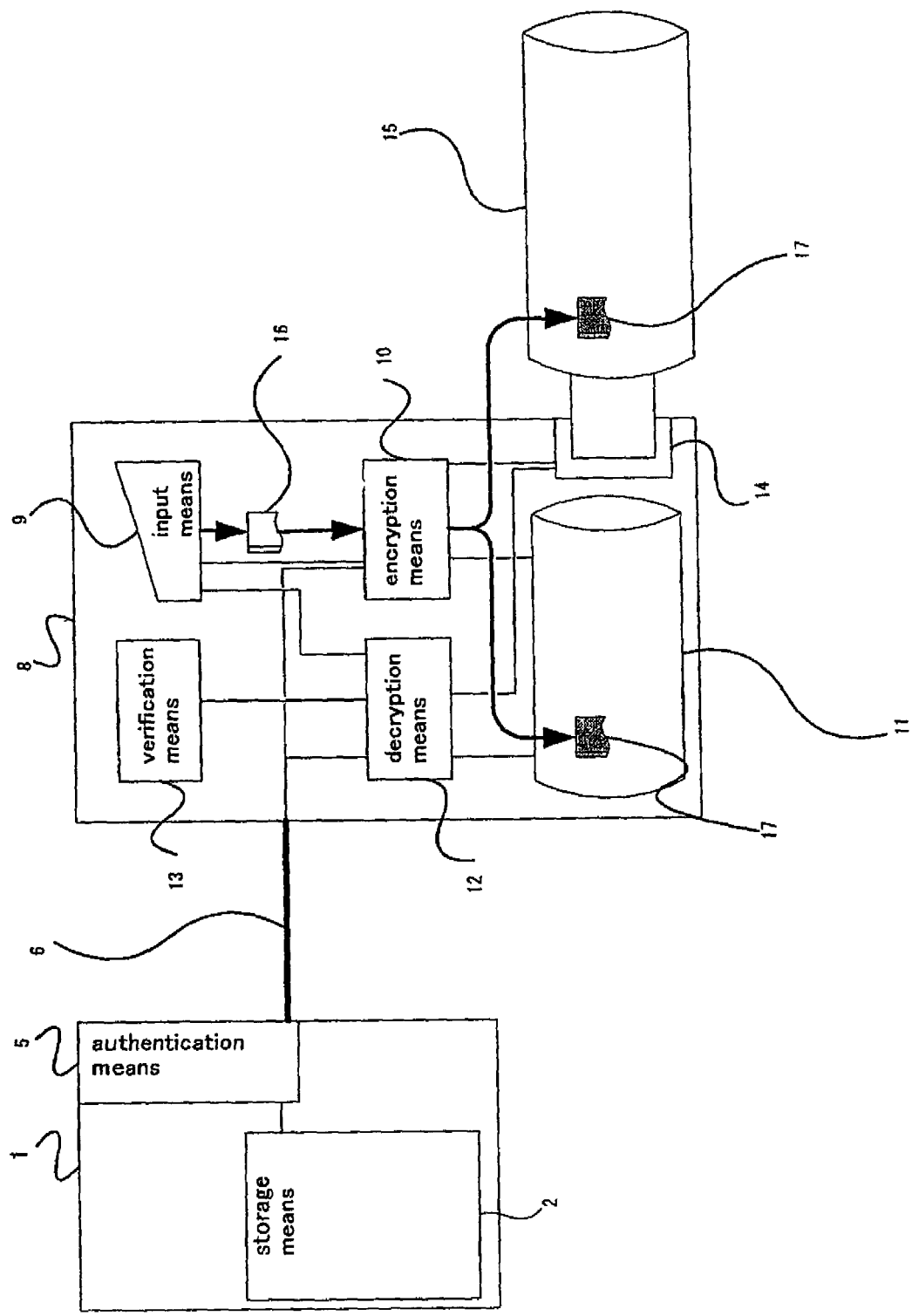

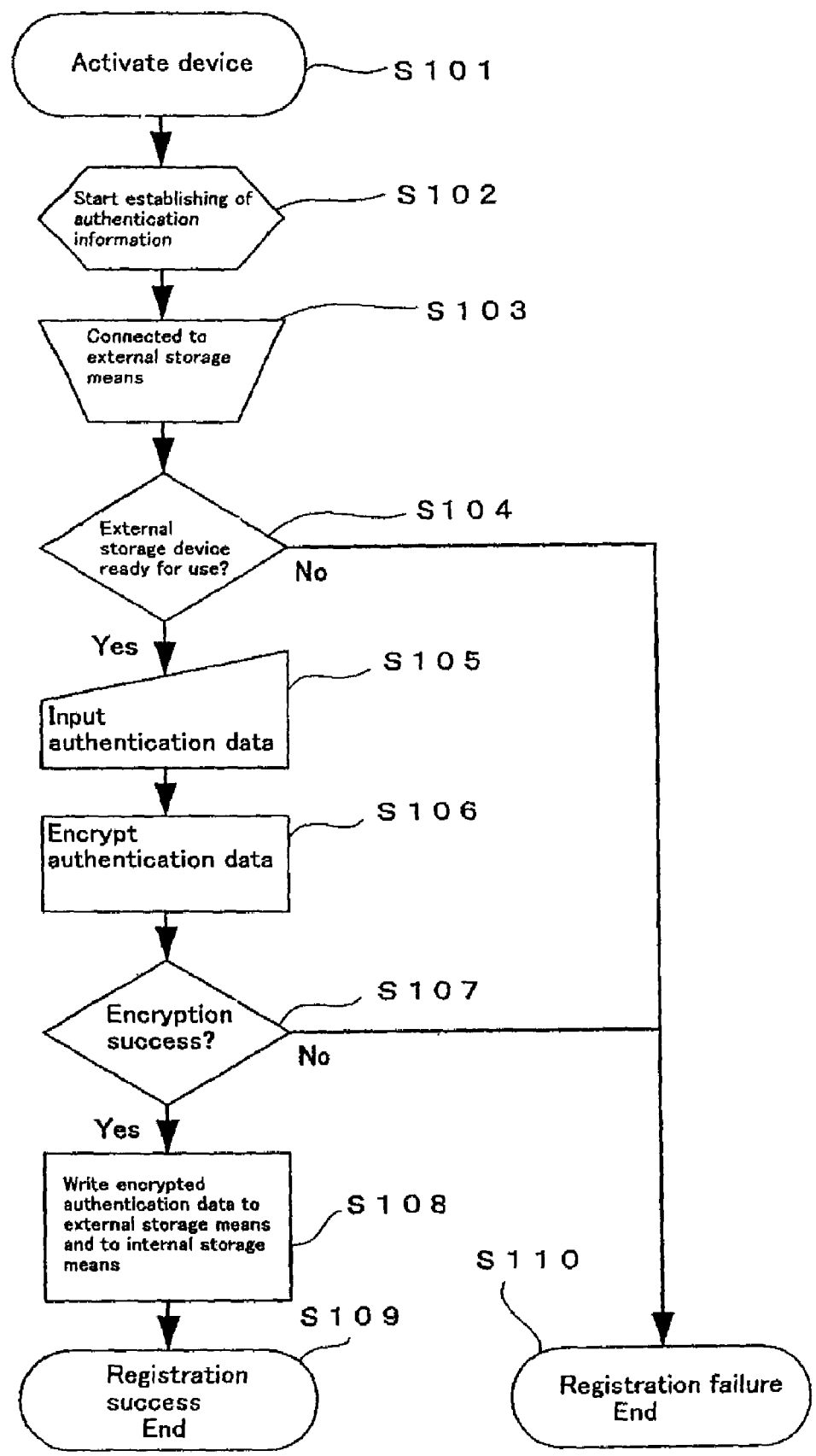
[Fig. 3]

[Fig. 4]
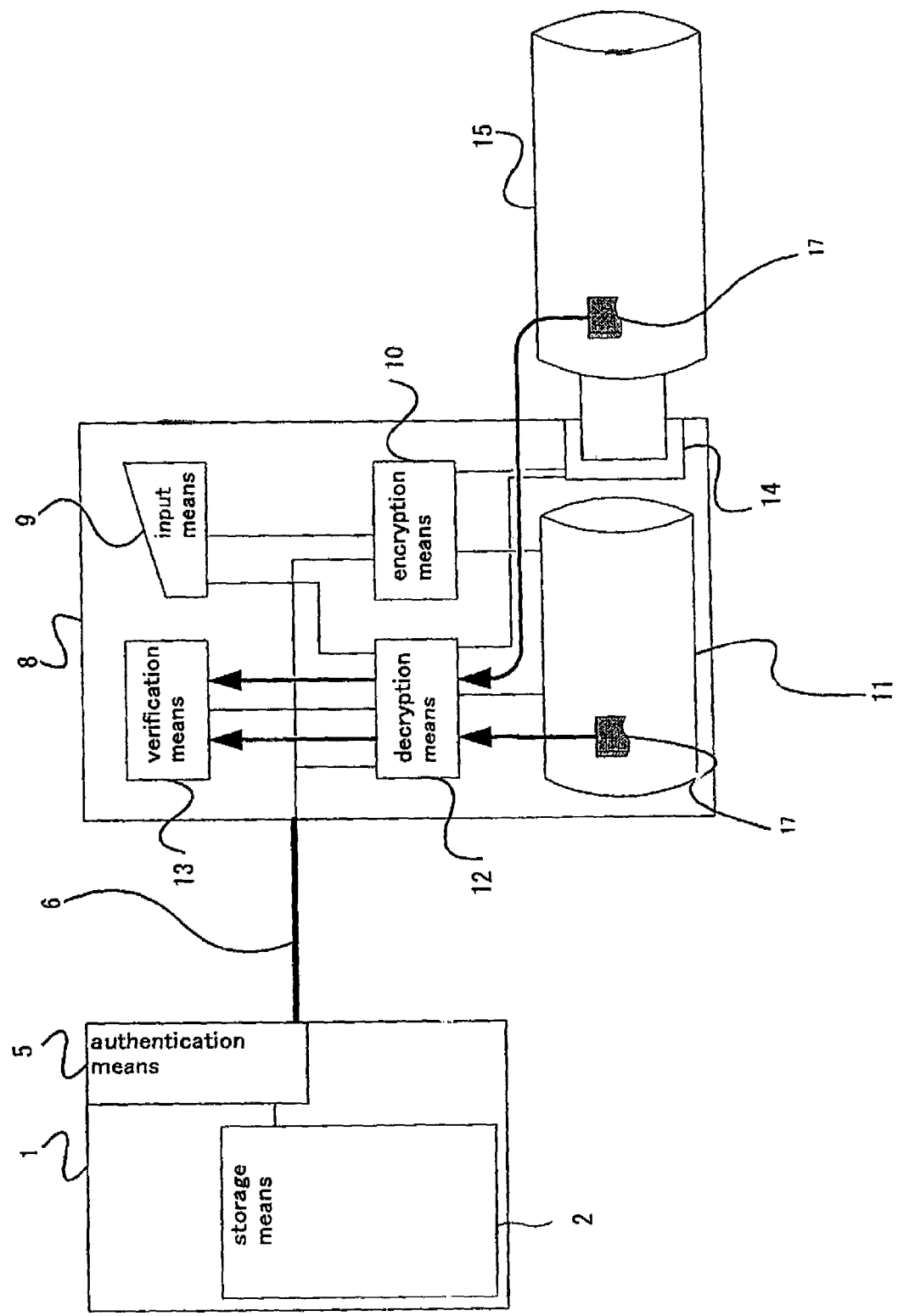

[Fig. 5]
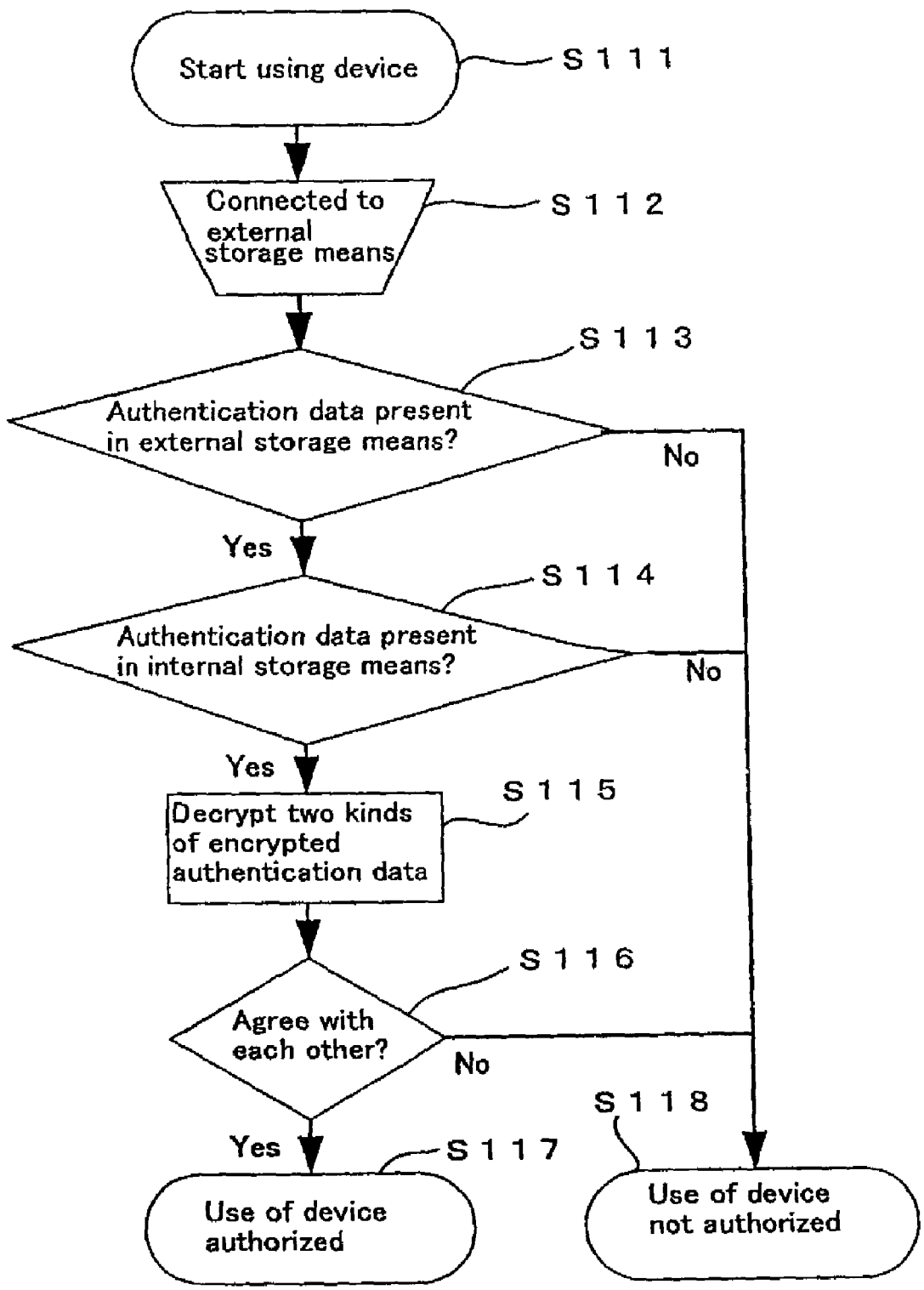

[Fig. 6]
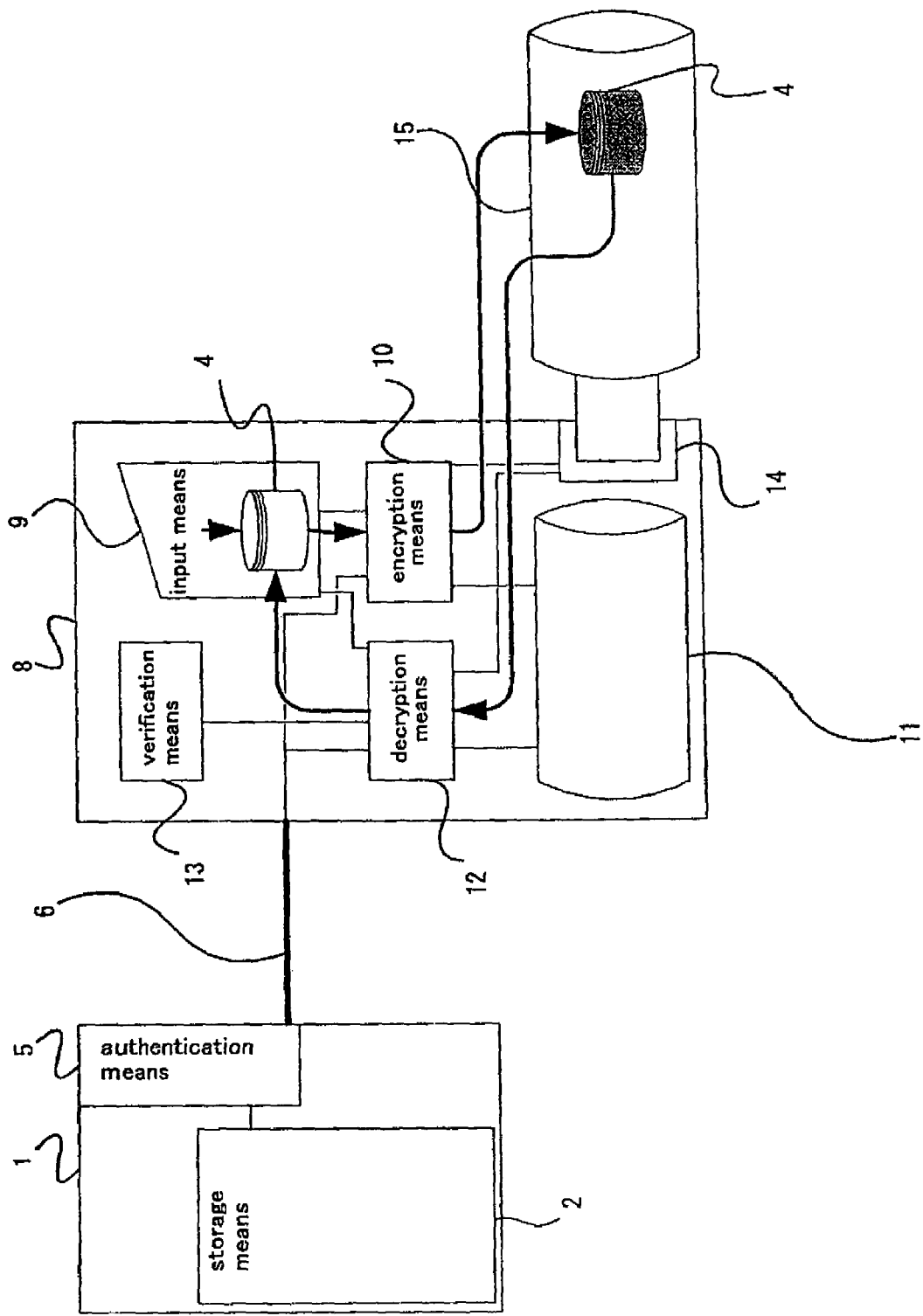

[Fig. 7]
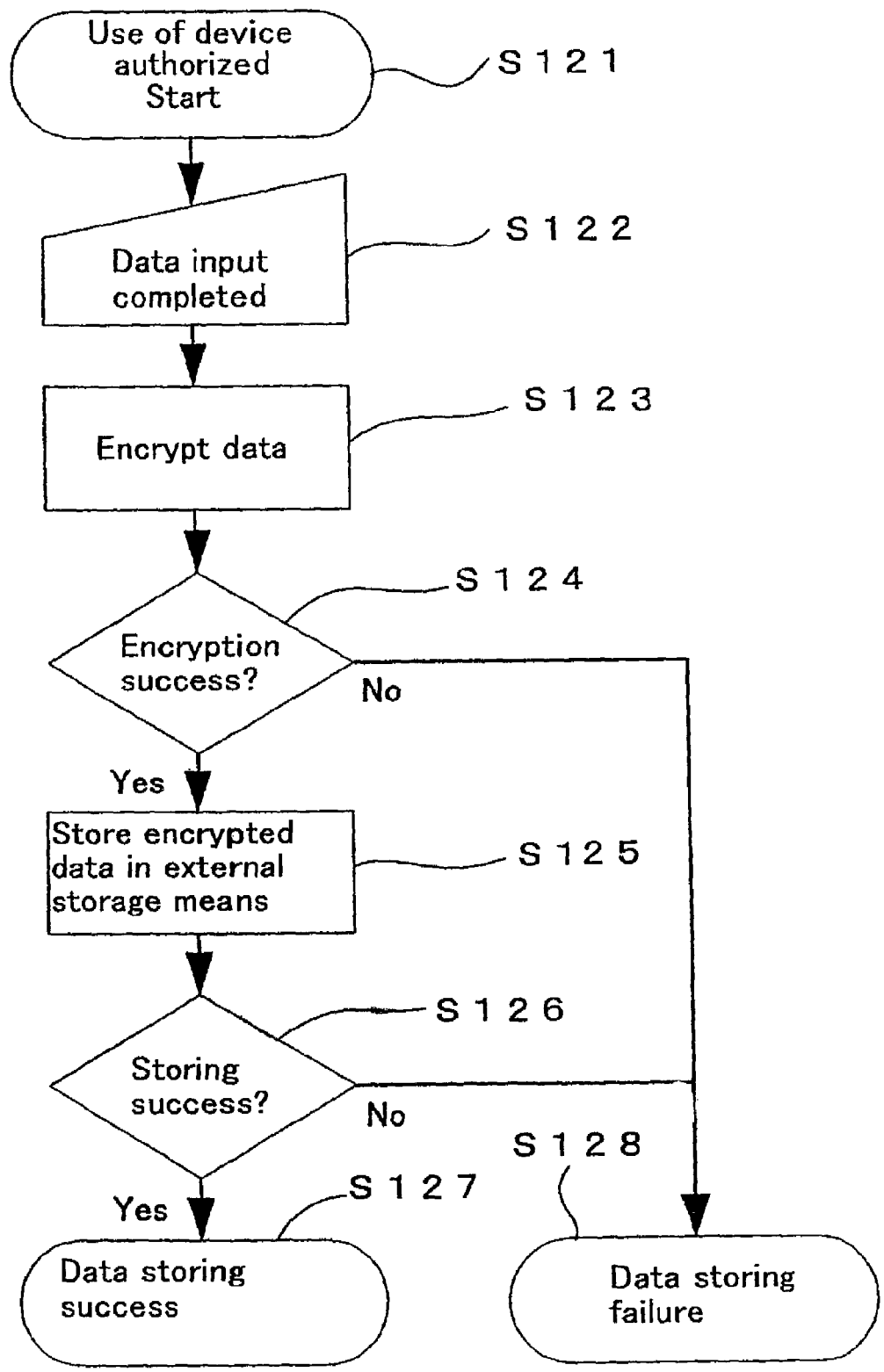

[Fig. 8]
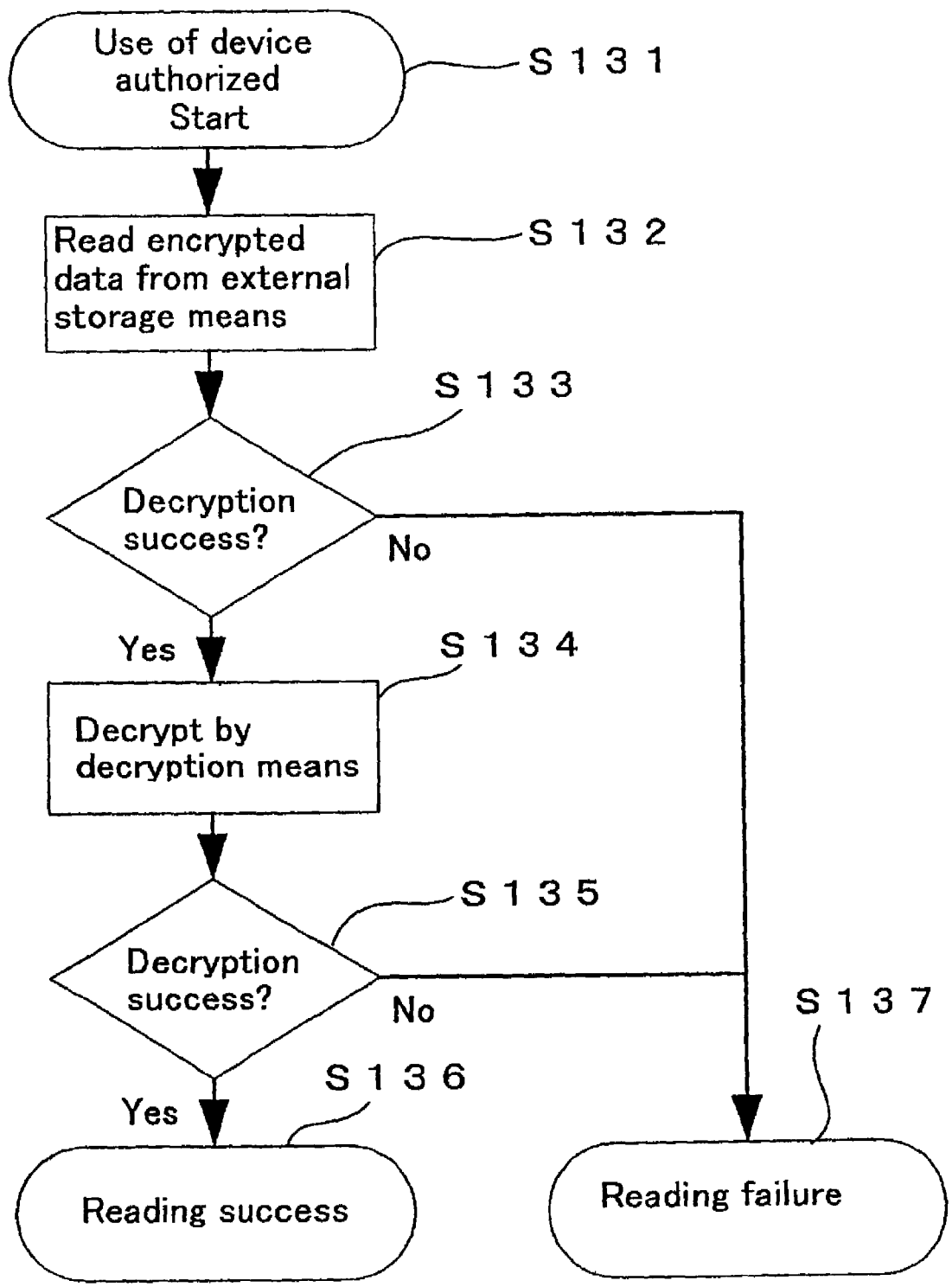

[Fig. 9]
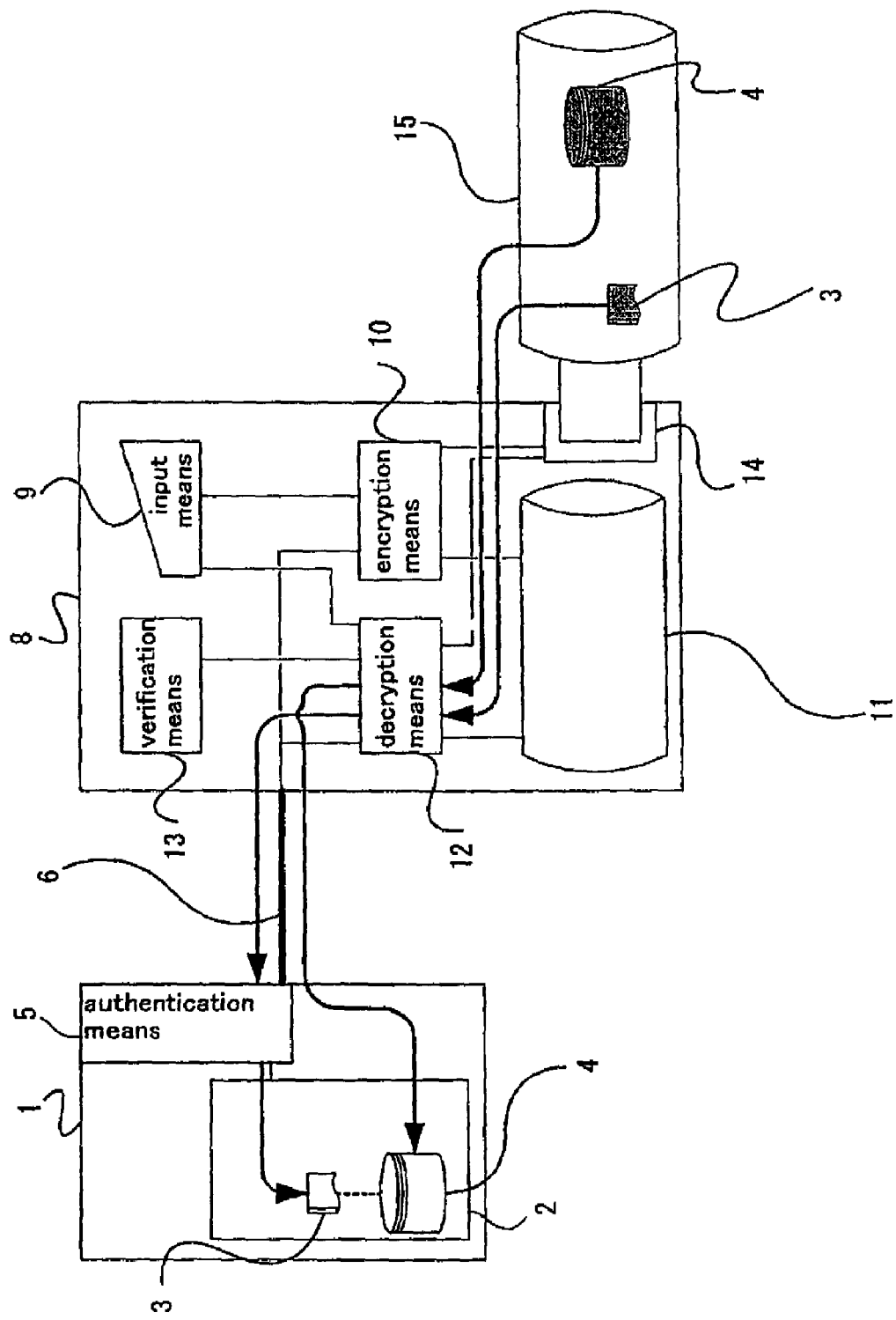

[Fig. 10]
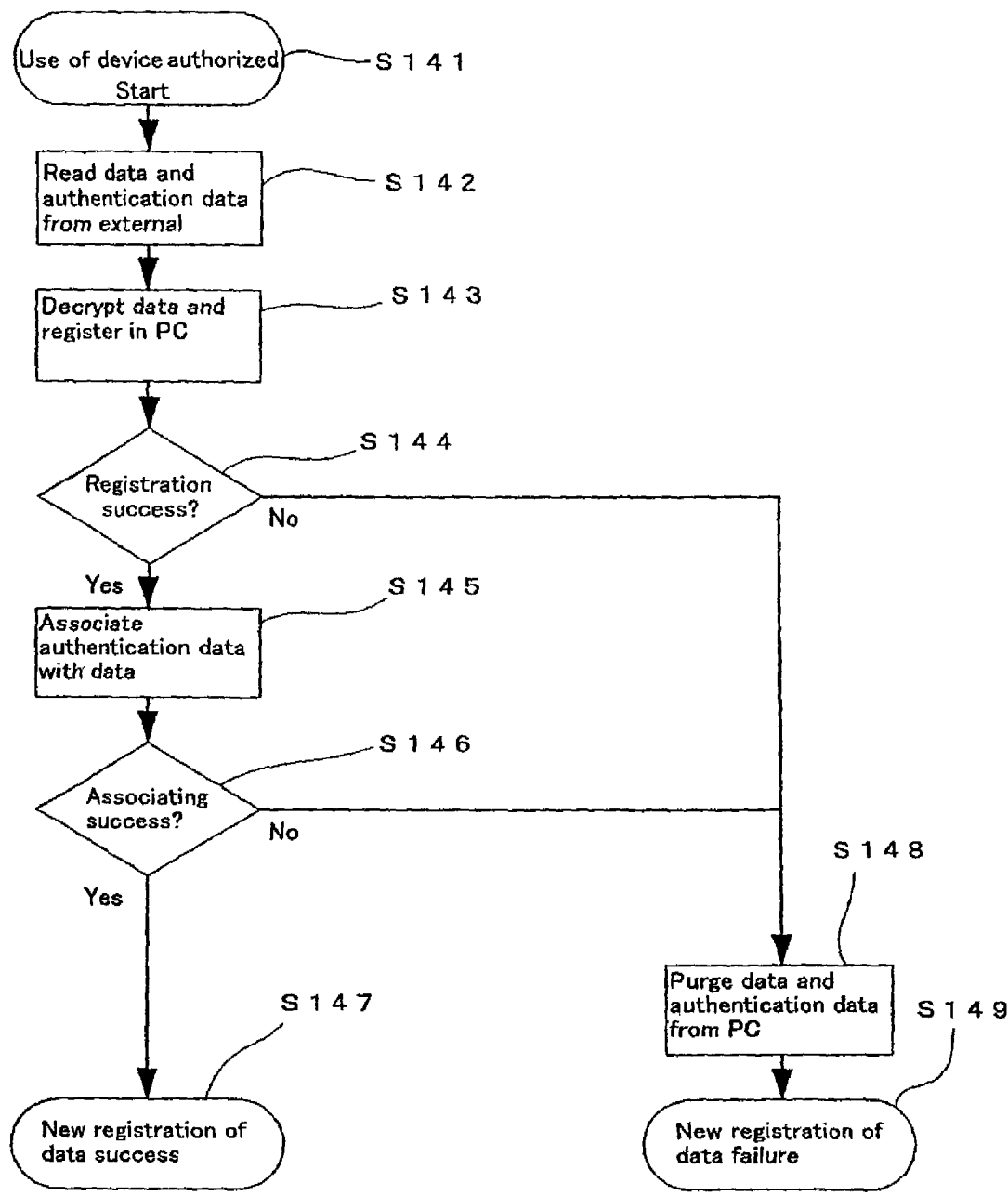

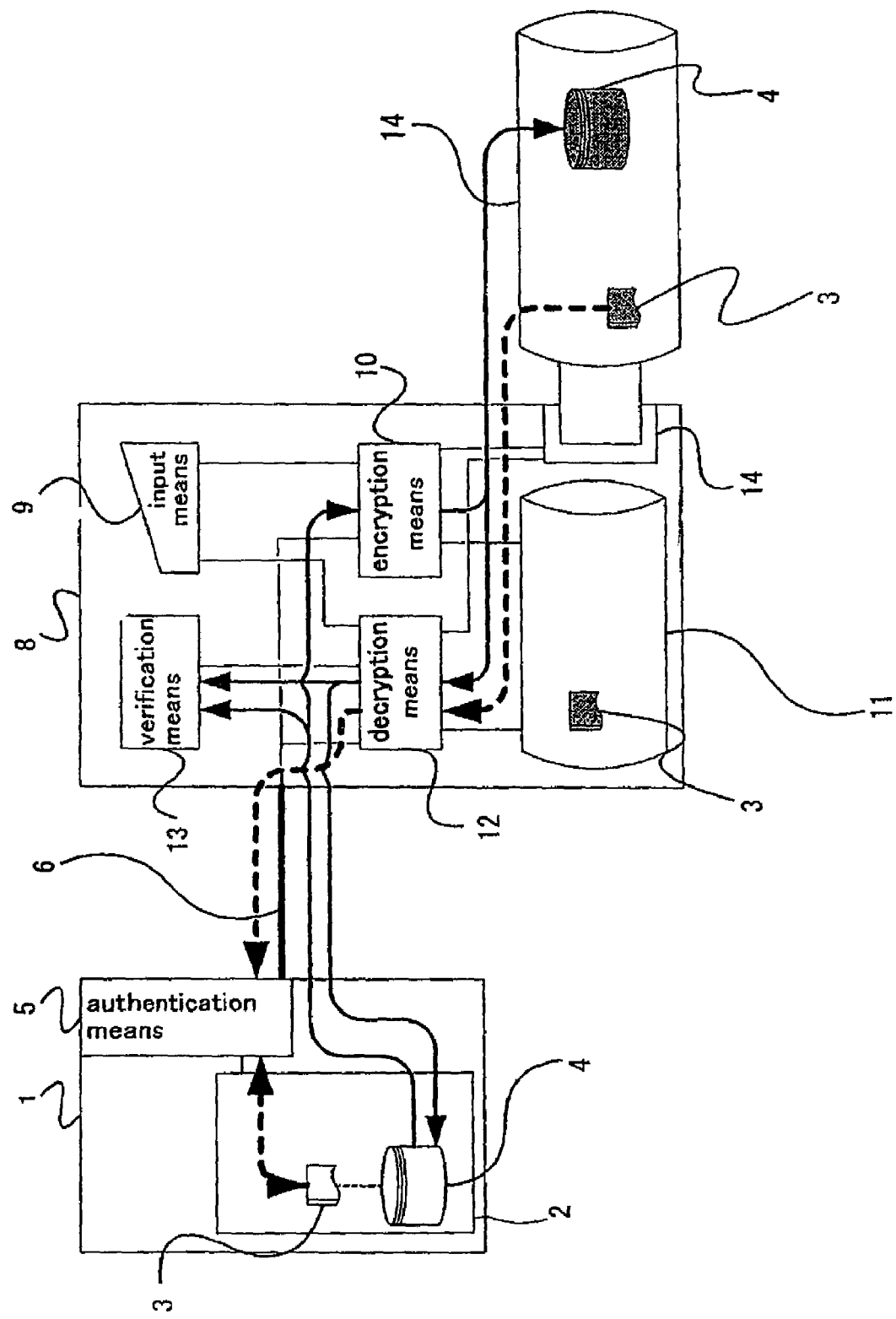
[Fig. 11]

[Fig. 1 2]
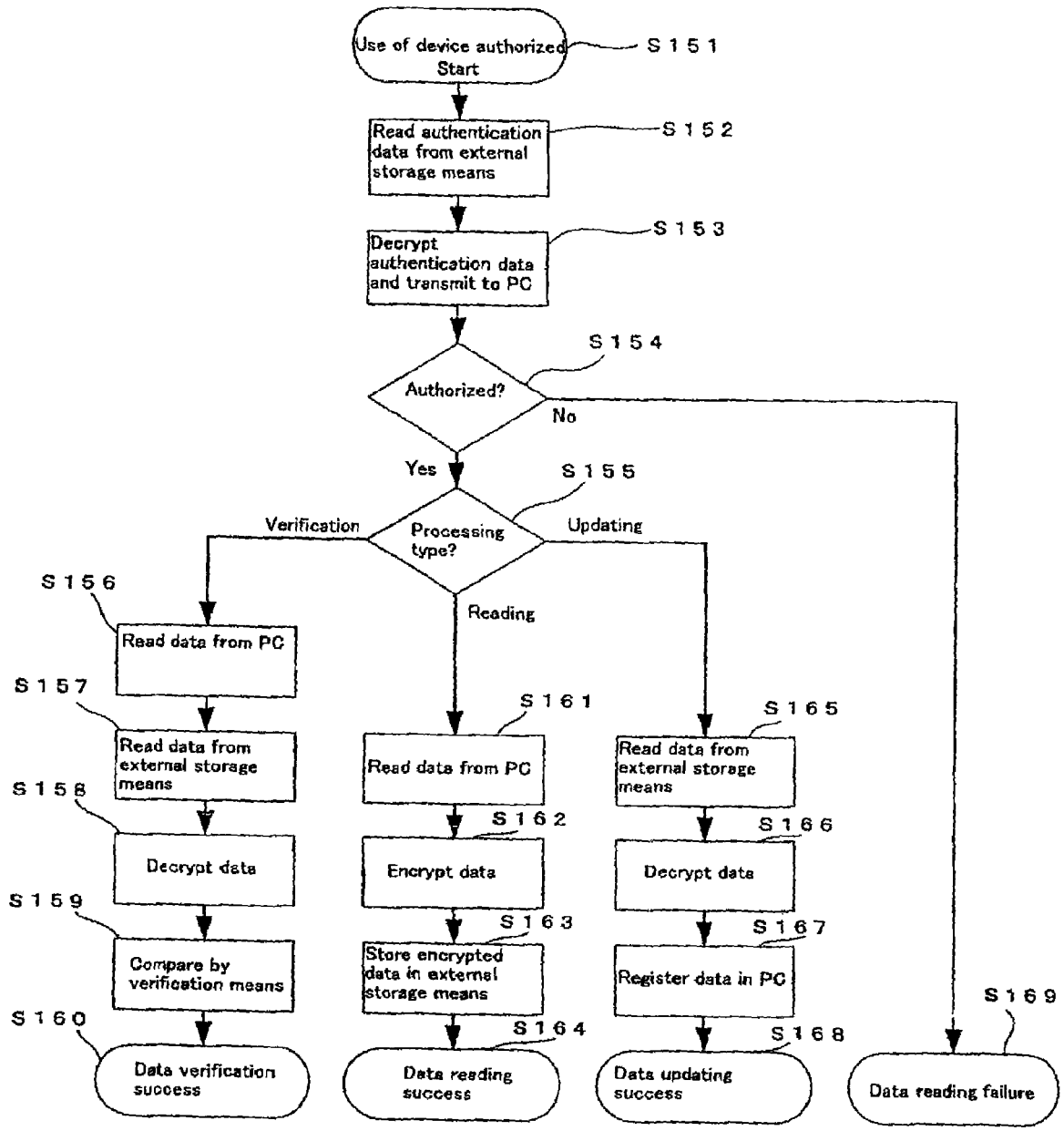

[Fig. 1 3]
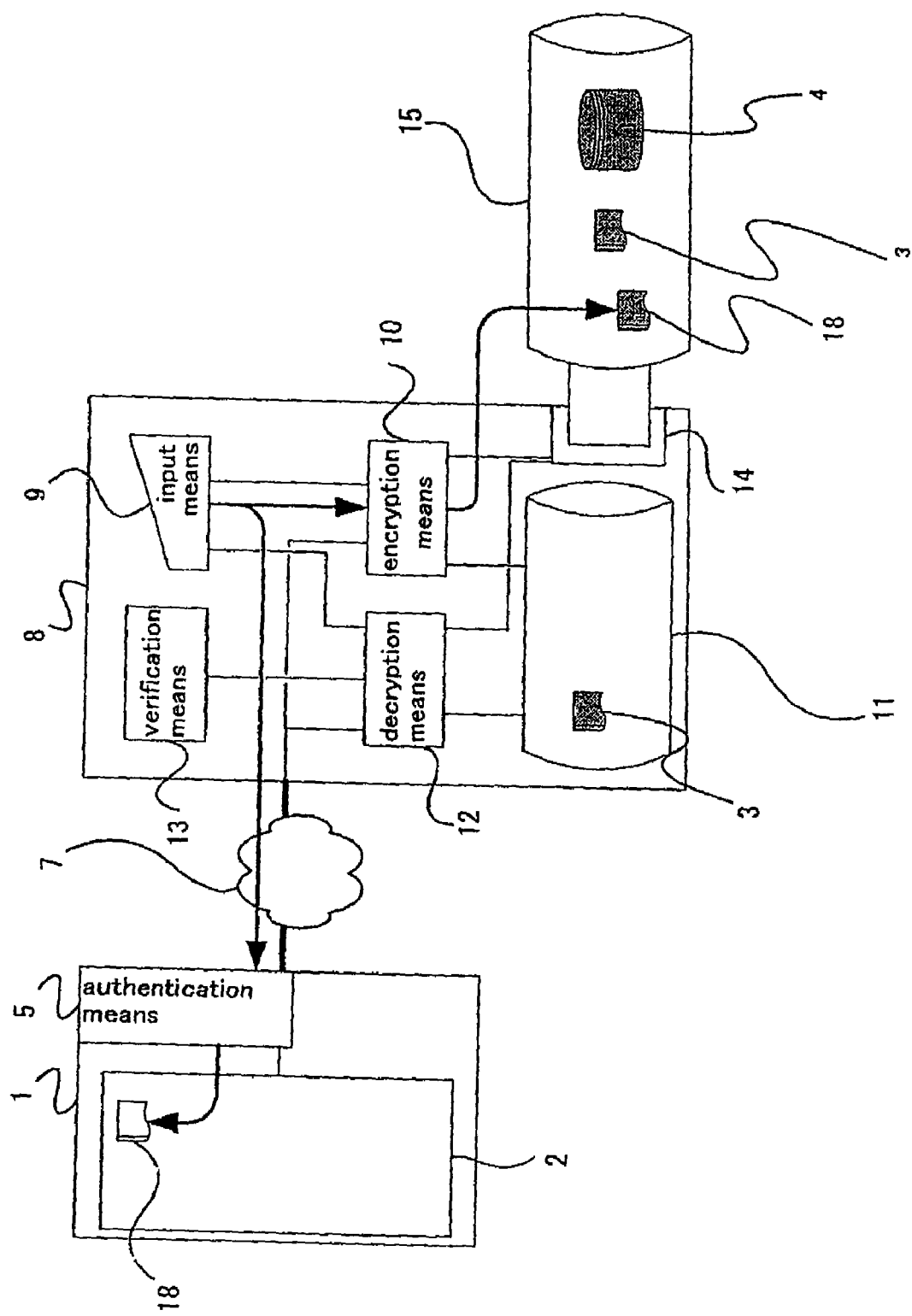

[Fig. 1 4]
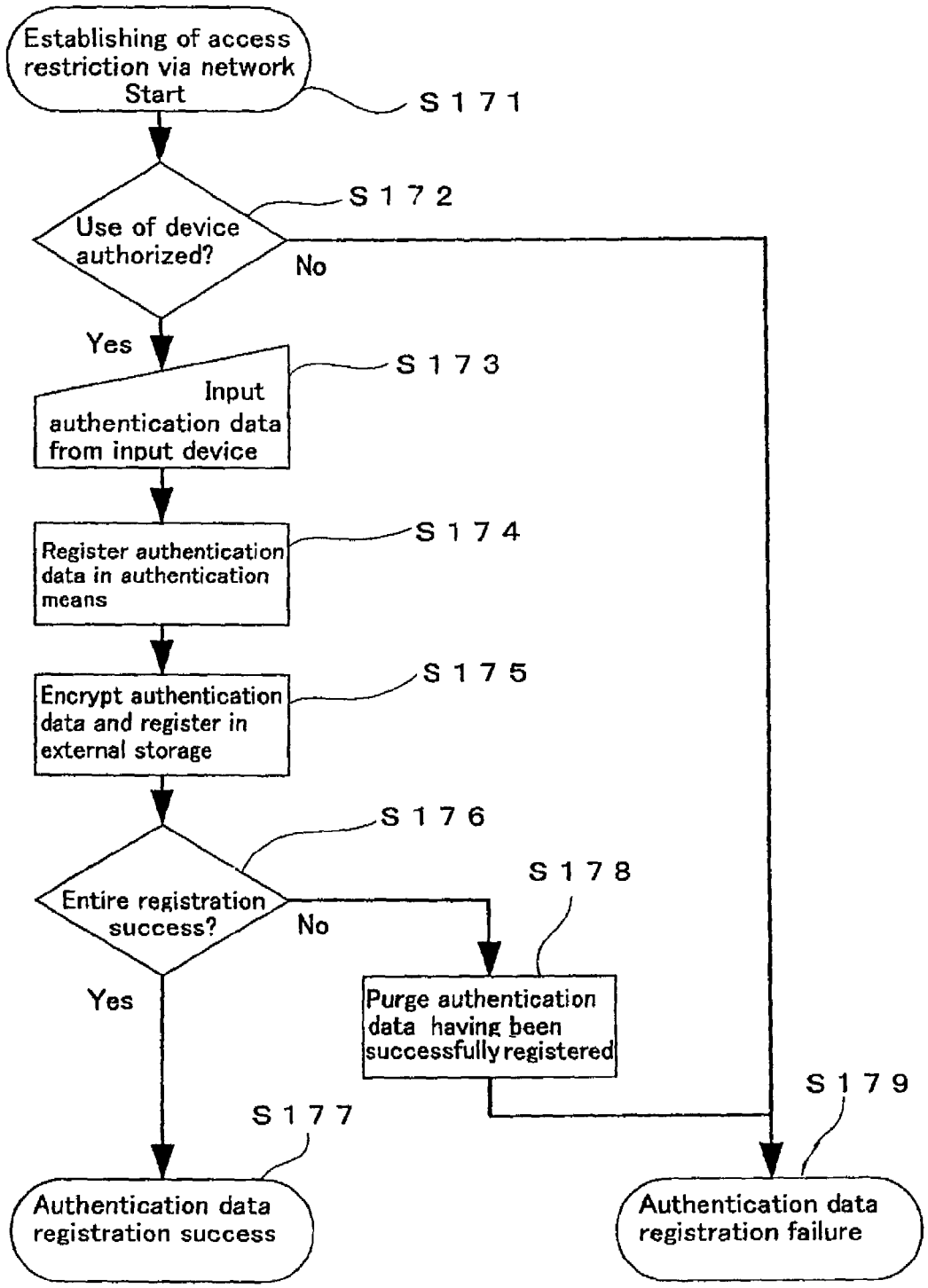

[Fig. 15]
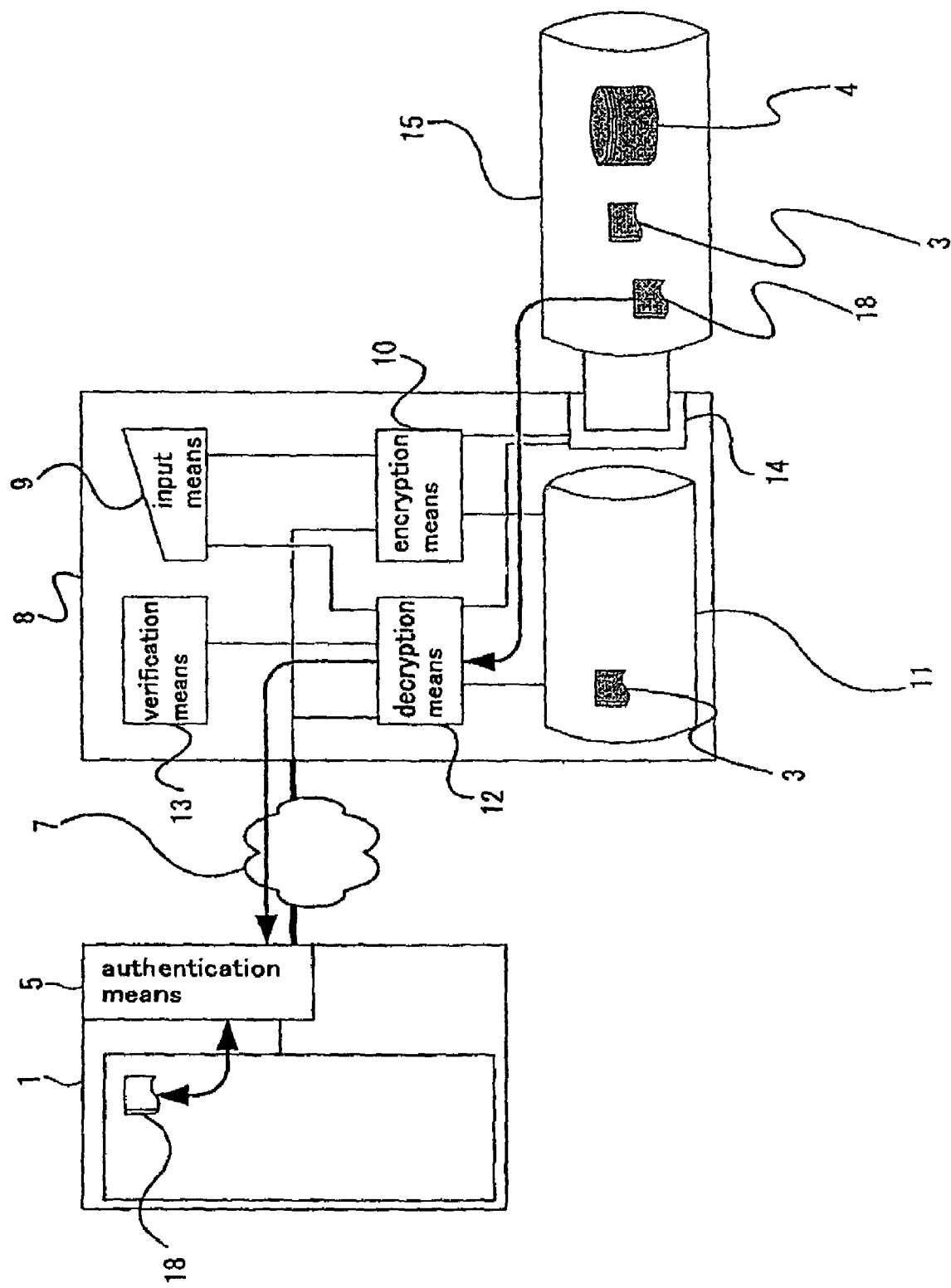

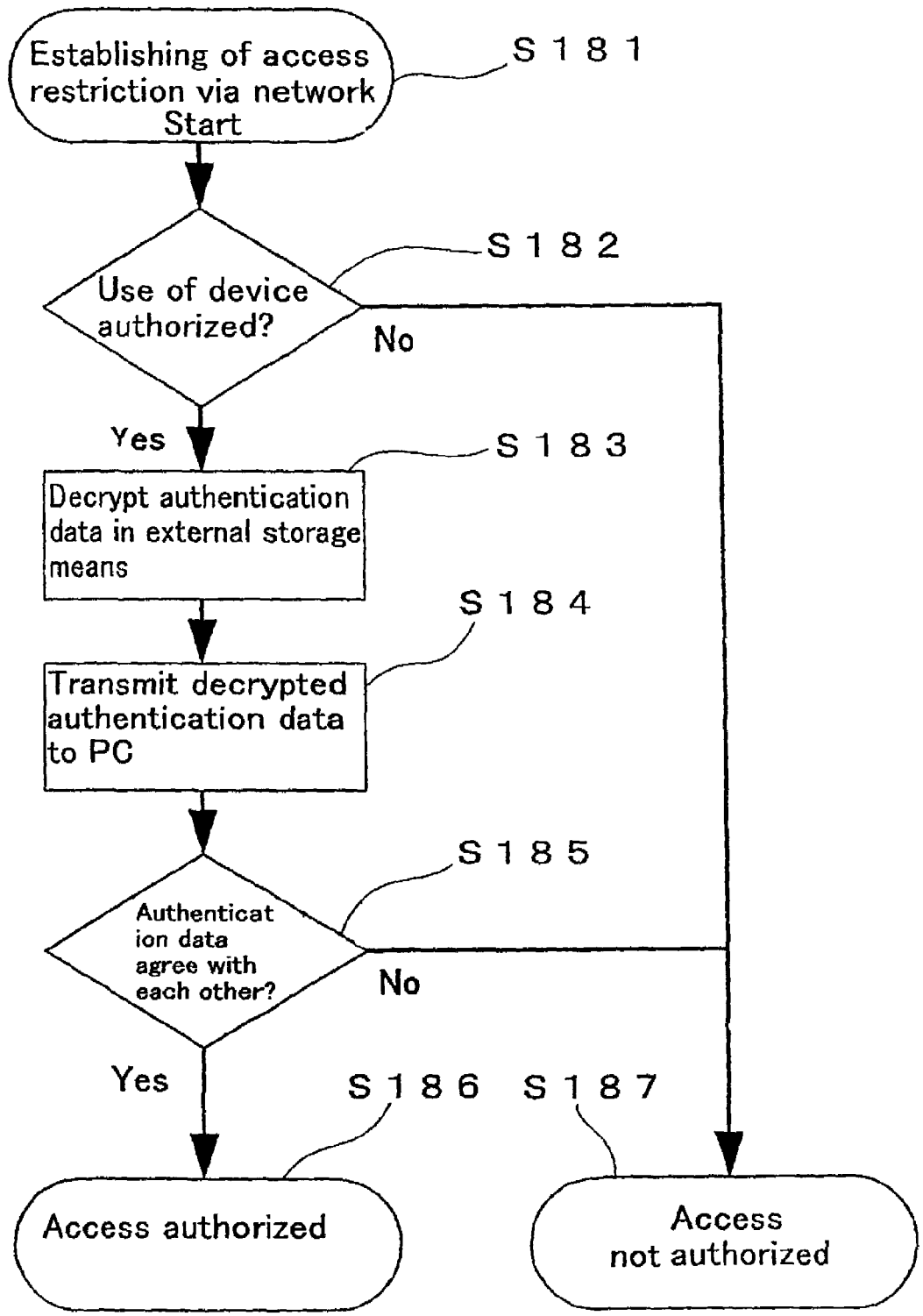
[Fig. 16]

PERIPHERAL DEVICE FOR PROGRAMMABLE LOGIC CONTROLLER

TECHNICAL FIELD

The present invention relates to a peripheral device for performing programming for a programmable logic controller (hereinafter referred to as a PC), that can communicate with the PC.

BACKGROUND ART

A conventional peripheral device for a PC is utilized while being connected directly to a PC via a connecting cable. In this case, the PC is equipped with an authentication means in order to restrict reading/writing of data registered in the PC. The authentication means can establish authentication data that is composed of arbitrary characters for the data in the PC. When a plurality of kinds of data is present, individual authentication data can be established for each data.

In order that the peripheral device for the PC may perform reading/writing of the data in the PC, for which the authentication data is established, it is required to input from an input means in the peripheral device the same authentication data as the authentication data established in the PC. If the input does not agree with the authentication data, the authentication is not authorized, so that the reading/writing with respect to the data cannot be performed.

In addition, the PC and the peripheral device can be connected with each other via a network. In this case, in order to restrict accesses to the PC via a network, the authentication means in the PC can be utilized. In the authentication function, authentication data for connection via a network is established. A user of the peripheral device connecting to the PC via a network must input from the input device the same authentication data as the authentication data having been registered, so as to enable reading/writing with respect to the data in the PC.

The establishing itself of the authentication data in the PC is performed so that arbitrary authentication data is inputted from the input means in the peripheral device via a connecting cable to the PC, and is registered in the PC. Here, if the authentication data has been already established, after authentication for the PC is authorized by inputting from the input device in the peripheral device the same authentication data as the authentication data having been established in the PC, new authentication data 12 can be established.

As an example of a conventional art, there is a technology described in Japanese Patent Laid-Open No. 124308/1998.

According to the technology described in Japanese Patent Laid-Open No. 124308/1998, information such as programs and parameter values required for PC operations is information assets in which know-how for a system owner to operate the system has been accumulated. Because greatest attention must be paid to leakage of data including the information assets to third parties, there is a method in which, in the viewpoint of protection against the leakage of the information assets, instructions for protection are embedded in a program to encrypt instruction words for the PC, whereby the instructions are made invisible to a user having no release key.

[Patent document 1] Japanese Patent Laid-Open No. 124308/1998

DISCLOSURE OF THE INVENTION

[Problem that the Invention is to Solve]

Even in the technology described in Japanese Patent Laid-Open No. 124308/1998, a problem has been that risks of data leakage due to an erroneous operation by a user who knows the authentication data, or due to obvious malice cannot be eliminated. For resolving the problem, measures such as regular updating of the authentication data and complicating the authentication data are conceivable. However, a problem has been that such measures generally increase load of the user of the peripheral device, which contradicts convenience in using the device.

The present invention aims to provide, in order to prevent dishonest operations associated with leakage of authentication data, and leakage of data that is information assets, a peripheral device for a PC, that does not damage convenience in using the device and that does not require to give out the content of data and authentication data to a user of the peripheral device.

[Means for Solving the Problem]

The present invention includes: an encryption means for encrypting peripheral device authentication data used in authentication for authorizing use of the programmable-logic-controller peripheral device itself, encrypting data used in the programmable logic controller, and encrypting authentication data that is established in the programmable logic controller and that verifies whether or not communication with the programmable logic controller is authorized for the data; an external storage means for storing at least peripheral device authentication data having been encrypted; an internal storage means for storing at least peripheral device authentication data having been encrypted; a decryption means for decrypting the peripheral device authentication data, the data, and the authentication data; and a verification means for determining whether or not use of the programmable-logic-controller peripheral device is authorized, by checking the peripheral device authentication data read out from the external storage means and decrypted, against peripheral device authentication data read out from the internal storage means and decrypted.

[Effects of the Invention]

The present invention includes: an encryption means for encrypting peripheral device authentication data used in authentication for authorizing use of the programmable-logic-controller peripheral device itself, encrypting data used in the programmable logic controller, and encrypting authentication data that verifies whether or not communication with the programmable logic controller is authorized for the data; an external storage means for storing at least peripheral device authentication data having been encrypted; an internal storage means for storing at least peripheral device authentication data having been encrypted; a decryption means for decrypting the peripheral device authentication data, the data, and the authentication data; and a verification means for determining whether use of the programmable logic controller is authorized, by checking peripheral device authentication data read out from the external storage means and decrypted, against peripheral device authentication data read out from the internal storage means and decrypted; so that a programmable-logic-controller peripheral device that does not damage convenience in using the device and that does not require to give out the content of data and authentication data to a user of the peripheral device can be provided.

BRIEF DESCRIPTION OF DRAWINGS

FIG. 1 is a configuration diagram illustrating the configurations of a PC 1 and a peripheral device for the PC 1 relevant to Embodiment 1 of the present invention.

FIG. 2 is a diagram for explaining a case in which peripheral device authentication data 16 is established for authorizing use of the PC1 in Embodiment 1 of the present invention.

FIG. 3 is a flowchart of the explanatory diagram in FIG. 2.

FIG. 4 is a diagram for explaining a case in which a verification means 13 checks the peripheral device authentication data 16 for authorizing the use of the PC1 in Embodiment 1 of the present invention.

FIG. 5 is a flowchart of the explanatory diagram in FIG. 4.

FIG. 6 is a diagram for explaining generation of data 4 in Embodiment 1 of the present invention after the use of the PC1 is authorized.

FIG. 7 is a flowchart for writing the data 4 in the explanatory diagram in FIG. 6.

FIG. 8 is a flowchart for reading the data 4 in the explanatory diagram in FIG. 6.

FIG. 9 is a diagram for explaining the new registration of the data 4 in the PC1 in Embodiment 1 of the present invention.

FIG. 10 is a flowchart of the explanatory diagram in FIG. 9.

FIG. 11 is a diagram for explaining reading/verification/updating of the data 4 in the PC1 in Embodiment 1 of the present invention.

FIG. 12 is a flowchart of the explanatory diagram in FIG. 11.

FIG. 13 is a diagram for explaining reading/verification/updating of the data 4 in the PC1 in Embodiment 2 of the present invention.

FIG. 14 is a flowchart of the explanatory diagram in FIG. 13.

FIG. 15 is a diagram for explaining reading/verification/updating of the data 4 in the PC1 in Embodiment 2 of the present invention.

FIG. 16 is a flowchart of the explanatory diagram in FIG. 15.

DESCRIPTION OF THE SYMBOLS

1: PC; 2: storage means; 3: authentication data; 4: data; 5: authentication means; 6: connecting cable; 7: network; 8: peripheral device; 9: input means; 10: encryption means; 11: internal storage means; 12: decryption means; 13: verification means; 14: external storage communication means; 15: external storage means; 16: peripheral device authentication data; 17: encrypted peripheral-device authentication data; 18: network authentication data.

BEST MODE FOR CARRYING OUT THE INVENTION

The best mode for carrying out the present invention will be described according to Embodiment 1 and Embodiment 2.

Embodiment 1

FIG. 1 is a configuration diagram illustrating the configurations of a PC 1 and a peripheral device for the PC 1 relevant to Embodiment 1 of the present invention.

The PC 1 includes a storage means 2, which has a function for storing authentication data 3 and data 4. In addition, the PC 1 includes an authentication means 5. The authentication means 5 can communicate with the storage means 2, and is installed so as to communicate also with a connecting cable 6 that is a communication means with the PC 1, or with a network 7 composed of electrical communication lines or the like. The authentication means 5 is a component for authorizing reading/writing of the data 4 with respect to the operation trying to perform reading/writing of the data 4 registered in the PC 1 via the connecting cable 6 or the network 7 composed of electric communication lines or the like, and determines the authorization based on whether or not the same data as the authentication data 3 has been inputted. The data 4 is information such as programs and parameter values required for the PC operations, and is information assets in which know-how for a owner of a system including a PC to operate the system has been accumulated.

Moreover, in the authentication means 5, the authentication data 3 can be composed of arbitrary characters. When a plurality of kinds of data 4 is present, individual authentication data 3 can be established for each data.

The peripheral device 8 includes an input means 9 for creating arbitrary authentication data 3 and data 4, an encryption means 10 for encrypting the authentication data 3 and the data 4 that have been inputted by the input means 9, and an internal storage means 11 for storing the authentication data 3 and the data 4 that have been encrypted by the encryption means.

Furthermore, the encryption means 10 can communicate via an external storage communication means 14 with an external storage means 15 that is located outside the peripheral device 8, and can store therein the authentication data 3 and the data 4 that have been encrypted.

The peripheral device includes a decryption means 12 for decrypting the encrypted authentication data 3 and the encrypted data 4 that have been stored in the internal storage means 11 or stored via the external storage communication means 14 in the external storage means 15 outside the peripheral device 8, and a verification means 13 for checking authentication data 3 in the internal storage means 11 against authentication data 3 in the external storage means 15, that have been decrypted by the decryption means 12, and for authorizing the authentication means 5 to read/write the data 3 if authenticated.

The operation will be described.

In order for the peripheral device 8 to read/write the data 4 in the PC 1, for which authentication data 3 is established, it is required to input the same authentication data as the authentication data 3 established in the PC 1 from the input means 9 in the peripheral device 8. If the input does not agree with the authentication data, the authentication is not authorized, so that reading/writing with respect to the data cannot be performed.

Therefore, firstly, when the PC 1 and the peripheral device 8 are used for the first time, establishing of authentication information for controlling access to the PC 1 is performed. FIG. 2 is a diagram for explaining a case in which the peripheral device authentication data 16 for authorizing use of the PC1 in Embodiment 1 of the present invention is established. Moreover, a flowchart of the explanatory diagram in FIG. 2 is illustrated in FIG. 3. Hereinafter, explanation of Embodiment 1 will be provided ignoring the network environment.

A user of the PC 1 and the peripheral device 8 firstly enables information communication between the external storage communication means 14 of the peripheral device 8 and the external storage means 15. In FIG. 3, the peripheral device 8 is activated (S101), and establishing of the authentication information is started (S102). After that, the external storage communication means 14 and the external storage means 15 are electrically connected whether by wired or by wireless connection (S103), and whether the external storage means 15 is ready for use is determined (S104). If the external storage means 15 is not ready for use, the establishing of the authentication information results in failure (S110).

If the external storage means 15 is ready for use, peripheral device authentication data 16 to be initially registered is inputted using the input means 9 (S105). The inputted peripheral device authentication data 16 is encrypted by the encryption means 10 (S106), and if the encryption fails (S107), the establishing of the authentication information results in failure (S 110). If the encryption succeeds (S107), the encrypted data is stored both in the external storage means 15 and in the internal storage means 11 as encrypted peripheral-device authentication data 17 (S109), and the processing is completed resulting in registration success (S109). Here, encrypted peripheral-device authentication data 17 to be stored in the external storage means 14 and encrypted peripheral-device authentication data 17 to be stored in the internal storage means 17 are individually encrypted with different encryption keys.

After the above-described procedures, in order to utilize the peripheral device 8, the peripheral device authentication data 16 is needed. FIG. 4 is a diagram for explaining a case in which the verification means 13 checks the peripheral device authentication data 16 for authorizing use of the PC1 in Embodiment 1 of the present invention. FIG. 5 is a flowchart of the explanatory diagram in FIG. 4.

In FIG. 4 and FIG. 5, the user of the peripheral device 8, after starting using the peripheral device 8 (S111), enables the external storage means 15, in which the encrypted peripheral-device authentication data 17 is registered, to communicate with the external storage communication means 14 in the peripheral device 8 (S112). The peripheral device 8 confirms that encrypted peripheral-device authentication data 17 is present in the external storage means 15 (S113), confirms that encrypted peripheral-device authentication data 17 is present in the internal storage means 12 (S114), and decrypts both data by the decryption means 12 (S115). After that, the peripheral device checks the decrypted results by the verification means 13 (S116). Only when the checking results in agreeing with each other, using the peripheral device 8 is authorized (S117). When using the external storage means 15 or the internal storage means 10 is not authorized, when encrypted peripheral-device authentication data 17 is not present (S113 or S114), when the decryption thereof fails, or when the checking does not result in agreeing with each other (S116), the peripheral device 8 cannot be used (S118).

Generation of the data 4, after access to the PC 1 is authorized so that the peripheral device 8 can be used, will be described. FIG. 6 is a diagram for explaining the generation of the data 4 in Embodiment 1 of the present invention after the use of the PC1 is authorized. FIG. 7 is a flowchart for writing the data 4 in the explanatory diagram in FIG. 6, and FIG. 8 is a flowchart for reading the data 4 in the explanatory diagram in FIG. 6.

In FIG. 6 and FIG. 7, the data 4 that the user has created and inputted using the input means 9 in the peripheral device 8 (S122) is encrypted (S123). After that, whether or not the encryption has succeeded is confirmed (S124), and then the encrypted data is stored in the internal storage means 11 or the external storage means 15 (S125). Whether or not the storing has succeeded is confirmed (S126), and if the storing has succeeded, then the storing of the data 4 results in success (S127). If the encryption in S124 or the storing of the data 4 in S126 has failed, then the data storing results in failure (S128). In addition, only the case in which the data has been stored in the external storage means 15 is illustrated in FIG. 6.

In FIG. 6 and FIG. 8, the user reads the encrypted data 4 from the internal input means 12 in the peripheral device 8 or from the external storage means 15 into the decryption means 12 (S132), and confirms whether or not the encrypted data 4 has succeeded in being read (S133). After that, the data is decrypted by the decryption means 12 (S134), and then whether or not the decryption has succeeded is confirmed (S135). If the decryption has succeeded, reading of the data 4 results in success (S136). If the reading in S133 or the decryption of the data 4 in S135 has failed, then the data reading results in failure (S137).

Therefore, only when the use of the peripheral device 8 has been authorized, the encrypted data 4 stored in the internal storage means 11 or in the external storage means 15 is read from the internal storage means 11 or from the external storage means 15, and decrypted by the decryption means 12 to be transferred as the original data 4 to the PC 1.

Then, when the data 4 is newly registered in the PC 1, the PC 1 automatically establishes authentication data 3 for the data 4 that is newly registered. FIG. 9 is a diagram for explaining the new registration of the data 4 in the PC1 in Embodiment 1 of the present invention. FIG. 10 is a flowchart of the explanatory diagram in FIG. 9. The encrypted data 4 stored in the external storage means 15 is registered in the PC 1.

In FIG. 9 and FIG. 10, in a state in which the use of the peripheral device 8 is authorized (S141), the user of the PC 1 and the peripheral device 8 reads in the decryption means 12 the encrypted authentication data 3 and the encrypted data 4 that have been stored in the internal storage means 11 or in the external storage means 15 (S142), which are decrypted by the decryption means 12 (S143). Then the authentication data 3 and the data 4 are transmitted via the connecting cable 6 that is the communication means to the PC 1, and are registered therein. If the registration succeeds (S144), the authentication means 5 associates the authentication data 3 with the data 4 (S145). And if the associating succeeds (S146), the new registration of the data 4 results in success (S147.). If the registration in S144 or the associating in S146 does not succeed, the data 4 and the authentication data 3 are purged from the PC (S148), and the new registration of the data 4 results in failure (S149).

In addition, although the explanation has been described assuming that the peripheral device authentication data 16 that has authorized use of the peripheral device 8 and the authentication data 3 for the data 4 to be newly registered in the PC 1 are different from each other, when the PC 1 establishes authentication data 3 for the data 4, authentication data 3 can be individually determined for each data 4, or can be determined as the same data as the peripheral device authentication data 16.

Accordingly, it is not necessary to input from the input means 9 the data 4 and the authentication data 3 for the protection therefor every time the data is registered in the PC 1. The operational work can be performed without giving out the data and the authentication data therefor to a user engaged in the operation. Moreover, there is a benefit in that, for a user who connects a conventional peripheral device 8 to the PC 1, as is conventionally done, unless the authentication data 3 that has been regularly stored in the external storage means 15 is inputted, the data 4 registered in the PC 1 cannot be accessed.

When the data 4 registered in the PC 1, protected by the authentication data 3, is read out, or when the data 4 is verified or updated, the authentication data 3 is automatically sent out. FIG. 11 is an explanatory diagram when the data 4 in the PC1 is read out, verified, or updated, in Embodiment 1 of the present invention. FIG. 12 illustrates a flowchart corresponding to the explanatory diagram in FIG. 11.

In FIG. 11 and FIG. 12, in a state in which the use of the peripheral device 8 is authorized, the user of the PC 1 and the peripheral device 8 can start the reading, the verification, or the updating of the data 4 registered in the PC 1 (S151). Firstly, because each data 4 is protected by authentication data 3, encrypted authentication data 3 is read out from the internal storage means 11 or from the external storage means 15 (S152), and is decrypted by the decryption means 12, to be transmitted to the PC 1 (S153). If the transmitted data agrees with the authentication data 3 associated with the data 4, then the authentication means 5 in the PC 1 authorizes the verification, the reading, or the updating of the data 4 in the PC 1 (S154). If the transmitted data does not agree with the authentication data 3 associated with the data 4, the reading of the data 4 results in failure (S169).

After the authentication in S154 is OK, when the data 4 is verified (S155), the data 4 is read from the PC 1 (S156), and the encrypted data 4 is read out from the internal storage means 11 or from the external storage means 15 into the decryption means 12 (S157) and is decrypted by the decryption means 12 (S158). After that, both the data 4 and the decrypted data 4 are compared with each other by the verification means 13 (S159), and if the verification of data succeeds, then the operation is completed (S160).

When the data 4 is read out (S155), the data 4 is read from the PC 1 (S161), the data 4 is encrypted by the encryption means 10 (S162), the encrypted data 4 is stored in the internal storage means 11 or in the external storage means 15 (S163), and then data reading is made successful (S164).

When the data 4 is updated (S165), the data 4 is read out from the internal storage means 11 or from the external storage means 15 into the decryption means (S166), the data 4 is decrypted by the decryption means 12 (S167), and the decrypted data 4 is registered in the PC 1 via the connecting cable 6 that is the communication means, whereby the updating is completed (S168). In this regard, authentication data 3 associated with the data 4 to be updated can be the same as the previous one, or can be changed to new authentication data 3 at updating time.

Accordingly, it is not necessary to input the authentication data 3 from the input means 9 every time the data 4 protected by the authentication data 3 is read, verified or updated. Each operation can be performed without giving out the data and the authentication data therefor to a user engaged in the operations. Moreover, there is a benefit in that, for a user who connects a conventional peripheral device 8 to the PC 1, as is conventionally done, unless the authentication data 3 that has been regularly stored in the external storage means 15 is inputted, operations on the data 4 registered in the PC 1 cannot be performed.

Therefore, according to Embodiment 1, a peripheral device includes: an encryption means 10 for encrypting peripheral device authentication data 16 used in authentication for authorizing use of the peripheral device 8 itself for a PC 1, encrypting data 4 used in the programmable logic controller, and encrypting authentication data 3 that is established in the PC 1 and verifies whether or not communication with the programmable logic controller is authorized for the data 4; an external storage means 15 for storing at least peripheral device authentication data 16 having been encrypted; an internal storage means 11 for storing at least peripheral device authentication data 17 having been encrypted; a decryption means 12 for decrypting the peripheral device authentication data 16, the data 14, and the authentication data 3; and a verification means for determining whether or not use of the peripheral device 8 for the PC 1 is authorized, by checking the peripheral device authentication data 16 read out from the external storage means 15 and decrypted, against peripheral device authentication data 16 read out from the internal storage means 11 and decrypted; so that a peripheral device 8 for a PC 1 that does not require to give out the content of data 4 and authentication data 3 to a user of the peripheral device can be provided.

According to Embodiment 1, in a case in which the operations on data associated with the PC 1 are restricted, or in a case in which the connection to the PC 1 is restricted, once the peripheral device authentication data 16 for releasing the restriction is established at the beginning, it is not necessary to give out the authentication data 3 itself to a subsequent operator, and there is a benefit in that security is enhanced.

In addition, data associated with the PC 1 is encrypted when being stored, whereby program data as information assets can be protected from dishonest utilization by third parties.

Embodiment 2

A case in which the PC 1 and the peripheral device 8 are connected via a network environment will be described.

The configuration is the same as in Embodiment 1 except that information is exchanged, only through the network 7, between the peripheral device 8 and the PC 1. In addition, portions not shown in diagrams are the same as in Embodiment 1. The same numerals in Embodiment 2 and Embodiment 1 indicate the identical or corresponding portions.

In order to prevent the PC 1 from likely being connected from other peripheral devices 8 via the network 7, network authentication data 18 for restricting the connection itself via the network 7 can be established. FIG. 13 is a diagram for explaining the establishing of authentication information for controlling access to the PC 1 via the network 7 in Embodiment 2 of the present invention. Moreover, FIG. 14 illustrates a flowchart of the explanatory diagram in FIG. 13.

In FIG. 13 and FIG. 14, in order to establish the network authentication data 18, firstly, the peripheral device 8 itself decrypts encrypted peripheral-device authentication data 17 stored in the internal storage means 11 and encrypted peripheral-device authentication data 17 stored in the external storage means 15, and determines by comparing the decrypted data by the verification means 13 whether the peripheral device is in an authorized state (S172). After that, the network authentication data 18 is inputted from the input means 9 (S173), and the network authentication data 18 is transferred to the authentication means 5 in the PC 1 via the network 7, and registered therein (S174). And meanwhile, the encryption means 10 encrypts the network authentication data 18, which is stored in the internal storage means 11 or in the external storage means 15 (S175). It is confirmed that all the steps through S175 have succeeded (S176), and if they have succeeded, registration of the network authentication data 18 is completed (S177). If the use of the device has not been authorized in S172, the registration of the network authentication data 18 results in failure (S179). If either the registration in S174 or the registration in S175 has failed, the network authentication data 18 is purged (S178), and the registration results in failure.

Then, when the PC 1 and the peripheral device 8 are connected with each other via the network environment, the network authentication data 18 for releasing restriction of the connection to the PC 1 can be obtained from the external storage means 15, and transferred to the PC 1. FIG. 15 is a diagram for explaining access from the peripheral device 8 to the PC 1 via the network 7 in Embodiment 2 of the present invention. FIG. 16 is a flowchart of the explanatory diagram in FIG. 15.

A user of the peripheral device 8, accessing the PC 1 to which the connection via the network 7 is restricted, decrypts encrypted authentication data 4 stored in the internal storage means 11 and encrypted authentication data 4 stored in the external storage means 15, and determines by comparing the decrypted data by the verification means 13 whether the peripheral device is in an authorized state (S182). After that, when the user accesses the PC 1 via the network 7, the encrypted network authentication data 18 stored in the internal storage means 11 or in the external storage means 15 is decrypted by the decryption means 12 (S183), and transmitted via the network 7 to the PC 1 (S184). The authentication means 5 in the PC 1 checks the transmitted network authentication data against the pre-registered network authentication data (S185), and if they agree with each other, the authentication means 5 authorizes the connection to the PC 1 (S186). If the use of the peripheral device 8 has not been authorized in S182, or if the network authentication data has not agreed in S185, then the connection to the PC 1 is not authorized (S187).

Therefore, in addition to the effects obtained according to Embodiment 1, according to Embodiment 2, when the communication between the PC 1 and the peripheral device 8 is via a network, the encryption means 10 is further for encrypting network authentication data 18 for authorizing the communication between the PC 1 and the peripheral device 8, the external storage means 15 is further for storing the network authentication data 18, and the decryption means 12 is further for decrypting the network authentication data 18 stored in the external storage means 15, whereby even if the communication between the PC 1 and the peripheral device 8 is via a network, the same effects can be obtained.

INDUSTRIAL APPLICABILITY

A peripheral device for a programmable logic controller relevant to the present invention is suitable for keeping information assets, such as programs in the programmable logic controller, secret.

What is claimed is:

1. A peripheral device for a programmable logic controller, the peripheral device comprising:
   an inputting means for inputting peripheral device authentication data being the same as authentication data stored in a storage means of the programmable logic controller;
   an encryption means for encrypting the peripheral device authentication data used in authentication for authorizing use of the peripheral device itself, encrypting data used in the programmable logic controller, and encrypting authentication data that is established in the programmable logic controller, the authentication data verifies whether or not communication with the programmable logic controller is authorized for the data used in the programmable logic controller;
   an external storage means for storing at least peripheral device authentication data having been encrypted;
   an internal storage means for storing at least peripheral device authentication data having been encrypted; a decryption means for decrypting the peripheral device authentication data, the data used in the programmable logic controller, and the authentication data; and
   a verification means for determining whether or not use of the peripheral device is authorized, by checking peripheral device authentication data read out from the external storage means and decrypted, against peripheral device authentication data read out from the internal storage means and decrypted.

2. The peripheral device for the programmable-logic-controller according to claim 1, wherein when communication between the programmable logic controller and the peripheral device is via a network:
   the encryption means is further for encrypting network authentication data for authorizing the communication between the programmable logic controller and the peripheral device;
   the external storage means is further for storing the network authentication data; and
   the decryption means is further for decrypting the network authentication data stored in the external storage means.

3. A peripheral device for a programmable logic controller, the peripheral device comprising:
   an input unit that enables a user to input peripheral device authentication data being the same as authentication data stored in a storage unit of the programmable logic controller;
   an encrypter that encrypts the peripheral device authentication data used in authentication for authorizing use of the peripheral device itself, encrypts data used in the programmable logic controller, and encrypts authentication data that is established in the programmable logic controller, the authentication data verifies whether or not communication with the programmable logic controller is authorized for the data used in the programmable logic controller;
   an external storage that stores at least peripheral device authentication data having been encrypted;
   an internal storage that stores at least peripheral device authentication data having been encrypted;
   a decrypter that decrypts the peripheral device authentication data, the data used in the programmable logic controller, and the authentication data; and
   a verifier that determines whether or not use of the peripheral device is authorized, by checking peripheral device authentication data read out from the external storage and decrypted, against peripheral device authentication data read out from the internal storage and decrypted.

4. The peripheral device for the programmable-logic-controller according to claim 1, wherein when communication between the programmable logic controller and the peripheral device is via a network:
   the encrypter is further for encrypting network authentication data for authorizing the communication between the programmable logic controller and the peripheral device;
   the external storage is further for storing the network authentication data; and
   the decrypter is further for decrypting the network authentication data stored in the external storage.

* * * * *